United States Patent [19]

Chalmers

[11] Patent Number: 4,687,222
[45] Date of Patent: Aug. 18, 1987

[54] TANDEM AXLE AIR SUSPENSION

[76] Inventor: Wallace G. Chalmers, 10 Avoca Ave., Suite 1504, Toronto, Ontario, Canada, M4T 2B7

[21] Appl. No.: 856,311

[22] Filed: Apr. 28, 1986

[51] Int. Cl.$^4$ .............................................. B60G 5/00
[52] U.S. Cl. .................................... 280/678; 280/683
[58] Field of Search .............. 280/678, 683, 711, 677, 280/681, 685, 104, 713, DIG. 1

[56] References Cited

U.S. PATENT DOCUMENTS

| | | | |
|---|---|---|---|
| 3,014,735 | 12/1961 | Lich | 280/678 |
| 3,315,979 | 4/1967 | Chalmers | 280/678 |
| 3,792,871 | 2/1974 | Chalmers | 280/681 |
| 4,406,479 | 9/1983 | Chalmers | 280/678 |

Primary Examiner—John J. Love
Assistant Examiner—Kann L. Ferriter
Attorney, Agent, or Firm—Arne I. Fors; Robert F. Delbridge

[57] ABSTRACT

An air suspension system for tandem axles vehicles includes a pair of inboard, laterally-spaced air springs disposed within or below the vehicle frame each in communication with a separate reservoir compartment. The air springs are connected to a transverse tubular cross member at their upper ends, which may function as to the air reservoir compartments and are seated on the interior ends of transverse levers, each lever articulating on a floating walking beam. Each floating transverse lever may be pivotally connected at its outer end to the lower end of an outrigger bracket which is mounted at its upper end on the frame of the vehicle. A rubber spring preferably is interposed between the outer end of the transverse lever and the outrigger bracket.

Upper torque rods interconnect the tandem axles and the vehicle frame, while lower torque rods interconnect the frame support bracket and the tandem axles.

13 Claims, 9 Drawing Figures

TANDEM AXLE AIR SUSPENSION

BACKGROUND OF THE INVENTION

This invention relates to vehicle suspensions and, more particularly, relates to pneumatic and rubber-pneumatic vehicle suspension systems.

Suspensions are essential elements in the structure of vehicles, such as heavy vehicles having tandem axles, and articulation of conventional suspensions often is limited and will not permit off-highway travel. Road travel of vehicles having such suspensions often is uncomfortable with poor road-holding characteristics when the vehicle is unloaded. Conversely, stability of the vehicle may suffer during full load conditions and during tilting of the vehicle beds during unloading such as by dumping, due to inherent instability with high centers of gravity.

Road shock under fully loaded and unloaded conditions usually is transmitted to the vehicle frame due to the lack of adequate cushion. Severe wear of the vehicle or damage to goods transported thus often results over rough road conditions, especially at high speeds.

U.S. Pat. No. 2,902,291 discloses a pneumatic suspension system for vehicles in which four bellows units positioned one on each side of a chassis forwardly and rearwardly of a single axle assembly obviate the need for torque rods and tubes. A longitudinally extending hollow member serves as a support and an air storage space for each pair of bellows units on a side of the vehicle, the said hollow member having a central partition to form two independent air reservoirs. Shock absorbers are required to damp oscillations of the vehicle. U.S. Pat. No. 2,896,964 discloses a combination of air and steel springs in which two different sets of air springs are provided. One set of springs is under constant load while another set is so arranged that it is actuated only when the first set is partially compressed such as, for example, when sway of the vehicle begins to occur.

Distortion of vehicle frames due to travel of single axle and tandem axle suspensions over uneven roadbeds often results in twisting of the frames with attendant transitional misalignment and "steering" of the axles.

It is a principal object of the present invention to provide an improved air suspension, preferably an air-rubber suspension, which effectively cushions road shock and vibration of a vehicle under all load conditions to improve the vehicle ride.

Another object of the invention is to provide an improved suspension which is self-damping under all load conditions to obviate the need for conventional shock absorbers, thus simplifying maintenance and repair.

A further object of the present invention is the provision of a suspension which allows substantially unlimited articulation of a tandem axle system. A torsionally-stiff cross member is provided to impart to the vehicle frame for improved axle alignment.

SUMMARY OF THE INVENTION

The present invention is directed to overcoming many of the problems inherent in known systems. According to the present invention this is accomplished by providing a suspension system for a vehicle having a frame and a pair of tandem axles disposed below said frame transversely thereof, said system comprising means interconnecting said axles to said frame for locating said axles relative to the frame and for permitting said axles to articulate relative to each other and to the frame, a walking beam disposed beneath said frame on each side thereof parallel to the longitudinal axis of the frame, each said walking beam resting at each end on an axle, an outrigger bracket extending outwardly from each side of the frame in substantial alignment with each other opposite the mid-point of a walking beam, a transverse lever pivotally mounted between its ends on each of said walking beams in alignment with an outrigger bracket and means for connecting the outer end of said transverse lever to the said outrigger bracket, a pair of air springs positioned under said frame in side-by-side relation in alignment with said transverse levers, and means for connecting the inner ends of said transverse levers to the underside of said air springs.

A transverse closed tubular cross-member is provided between the frame longitudinal channel members in alignment with the outrigger brackets to provide torsional stiffness to the frame and to maintain substantial alignment of the tandem axles. The tubular cross-member may be rectangular in cross-section, e.g. square, or may be circular in cross-section.

The suspension system includes a compartmented air reservoir mounted within the vehicle frame for each of said air springs with communicating means for permitting the flow of air between each air spring and its respective reservoir compartment. The reservoirs may be incorporated into the tubular cross-member extending transversely of said frame from one side of said frame to the other having a centre baffle for dividing said tubular cross-member into two compartments. Damping means are provided in the communicating means between each air spring and its respective reservoir compartment. This restricts the return flow of air from the reservoir to the air spring relative to the flow of air from the air spring to the reservoir to damp vehicle and suspension oscillations.

A rubber spring preferably is interposed between the outer end of the transverse lever and the outrigger bracket to further damp oscillations of the vehicle and the suspension and to further effectively cushion the vehicle from road shock.

BRIEF DESCRIPTION OF DRAWING

The objects of the invention and the manner in which they can be attained will become apparent from the following detailed description of the drawings, in which.

Like reference characters will refer to like parts throughout the description of the drawing.

DESCRIPTION OF THE PREFERRED EMBOMIMENTS OF THE INVENTION

With reference now to FIGS. 1–4 of the drawings, the first embodiment of suspension system of the invention illustrated therein comprises a central tubular cross member 10 rigidly connected at its opposite ends 12, 14 to the opposed interior sides of mainrail channel members 16, 18 which comprise the side members of the vehicle chassis frame. Tubular cross member 10 preferably is cylindrical in shape and is centrally divided by means of an interior baffle or wall 20 formed therein into a pair of reservoir compartments 22, 24.

A pair of laterally spaced-apart pneumatic bellows or air springs 26, 28 such as FIRESTONE AIRSTROKE TM 19-0.75 are secured by bolts at their upper ends to tubular extensions 25, 27 extending downwardly from the underside of cross member 10 for communication with air reservoir compartments 22, 24 respectively. The lower ends of air springs 26, 28 are secured by bolts to the inner ends of transverse levers 30, 32 which in turn straddle and rock on the centres of longitudinal walking beams 34, 36 respectively. The outer ends 38, 40 of transverse levers 30, 32 are pivotally connected by pins 33 to outrigger brackets 42, 44 which are secured to and depend laterally outwardly from the sides of frame members 16, 18. As illustrated most clearly in the embodiment of the invention shown in FIG. 4, outriggers 42, 44 depend outwardly and downwardly in lateral alignment with each other and with transverse levers 30, 32 to a height substantially level with the upper surfaces of the inner ends of levers 30, 32.

Figure 1:
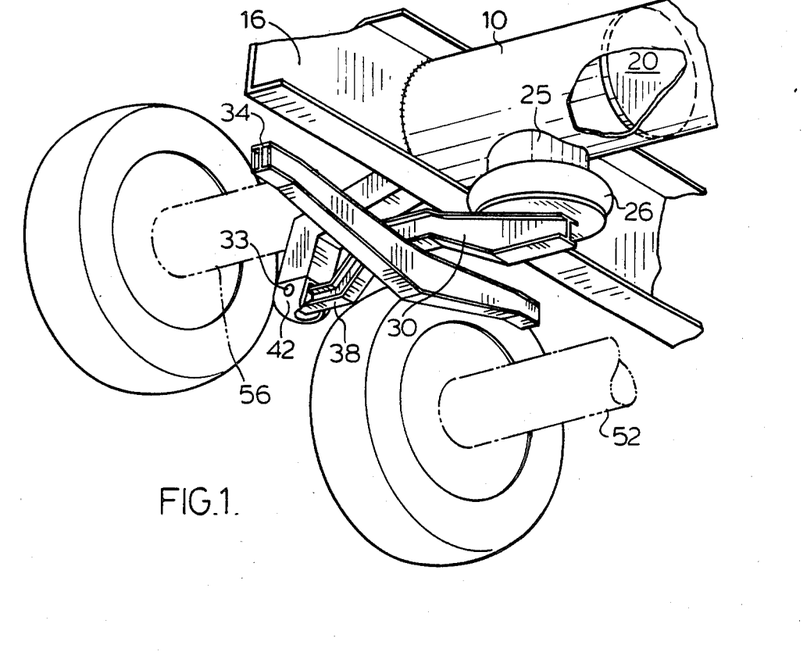
FIG. 1 is a lower perspective view of an embodiment of the suspension of the present invention employing an air spring.
Figure 2:
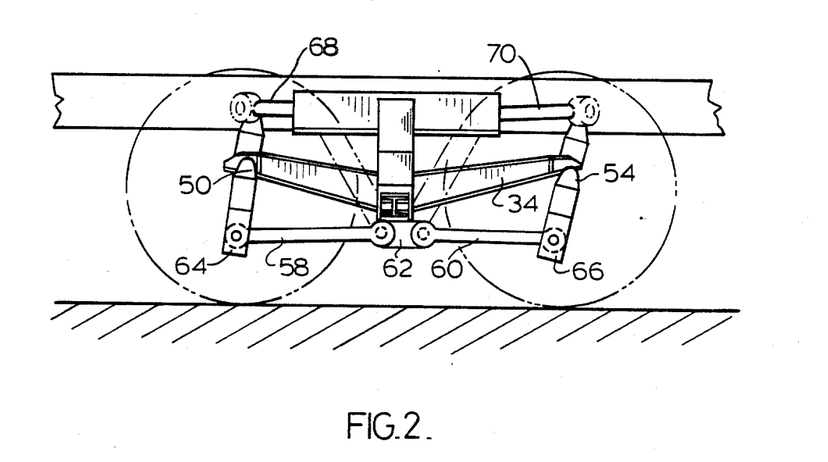
FIG. 2 is a side elevation of the suspension illustrated in FIG. 1.
Figure 3:
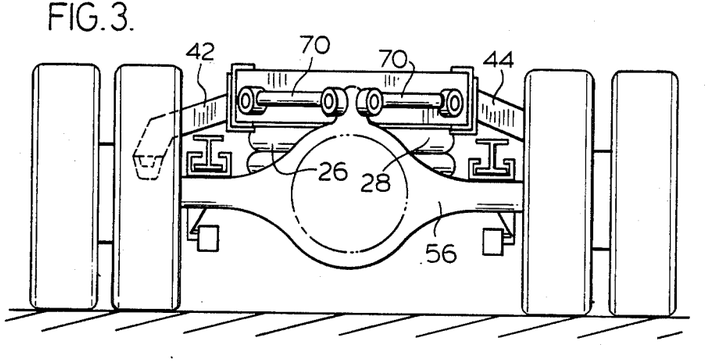
FIG. 3 is a rear end elevation of the said suspension showing a vehicle axle.
Figure 4:
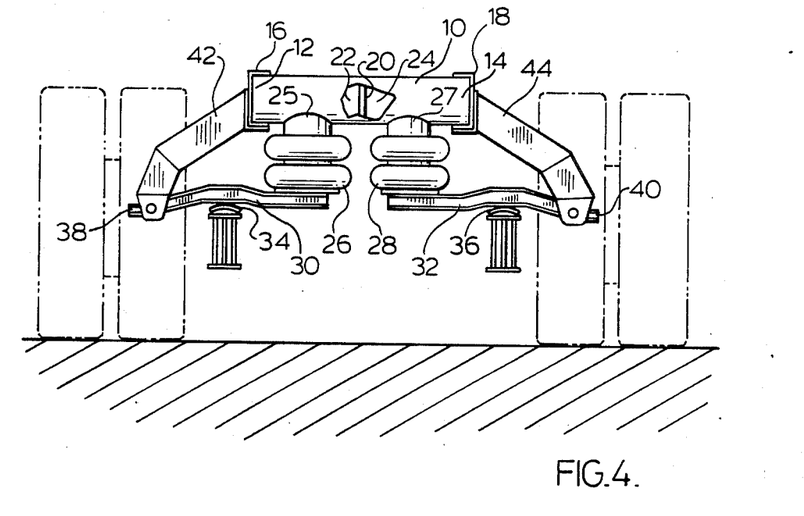
FIG. 4 is an elevation of the said suspension taken ahead of the axle shown in FIG. 3.
Figure 7:
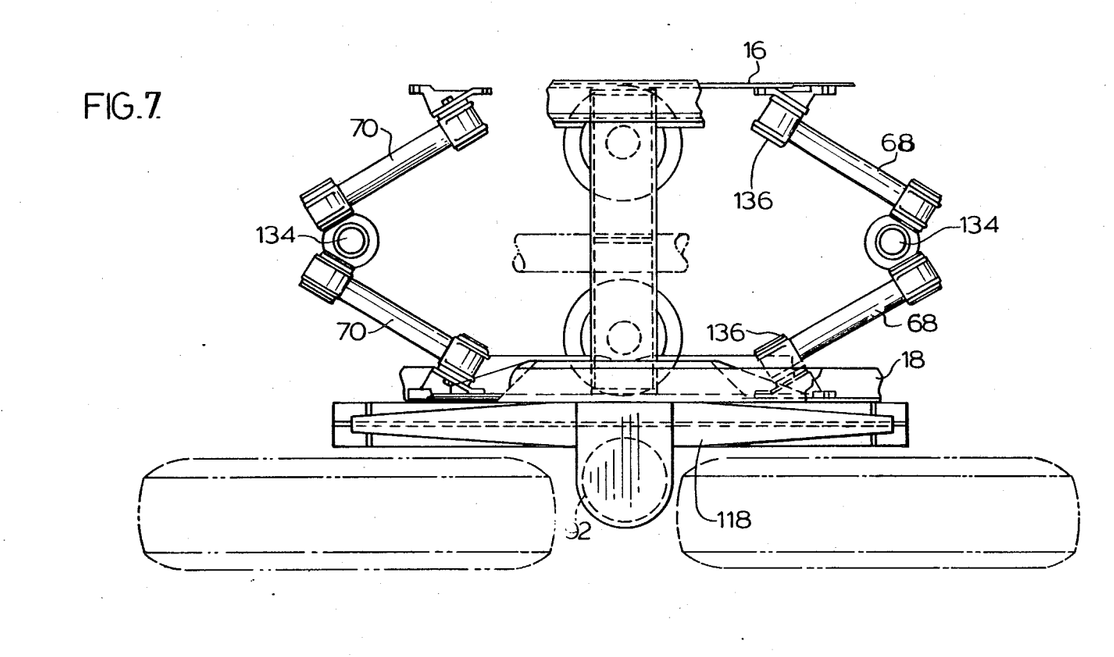
FIG. 7 is a top plan view of the suspension illustrated in FIG. 5.
Figure 8:
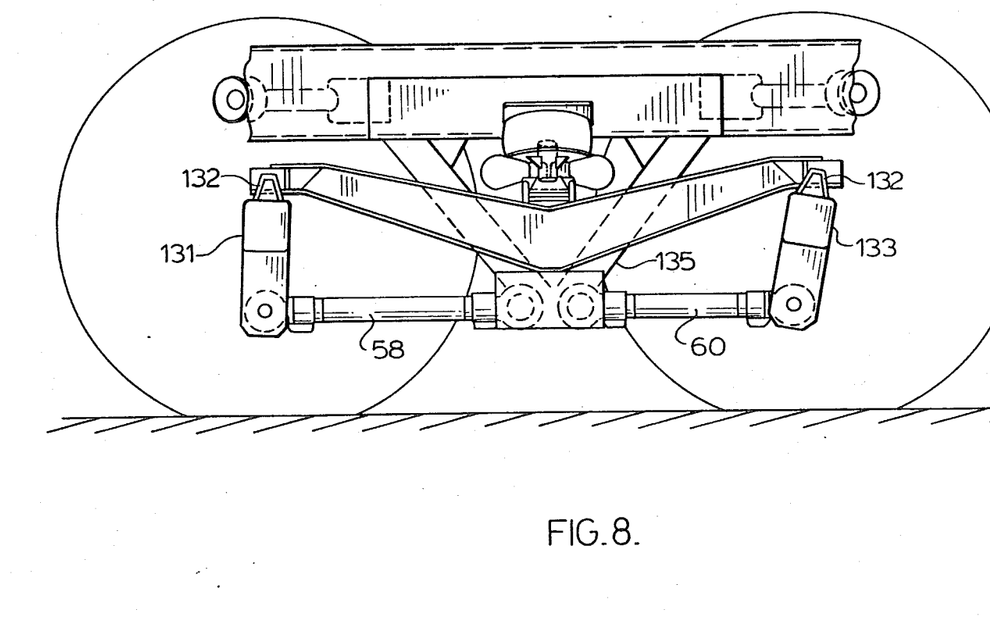
FIG. 8 is a side elevation thereof.

With particular reference now to FIGS. 2 and 3, it will be seen that walking beam 34, which is typical of both walking beams 34 and 36, is seated at its forward end on saddle 50 which is secured to an end of forward axle 52. The rearward end of beam 34 is seated on a saddle 54 which is secured to an end of rear axle 56. A pair of lower longitudinal torque rods 58, 60 are secured to a frame bracket or saw horse 62 at their inner ends and to front and rear axle supports 64, 66 respectively on each side of the suspension in order to resist longitudinal forces and to locate and maintain the axles parallel to each other. Two pairs of diagonal upper torque rods 68, 70 are secured at their inner ends to towers 69, 71 on banjo housings 73, 75 and at their outer ends to the frame members 16, 18. The twin upper rods complete a parallelogram when viewed from the side in FIG. 2 and maintain the axle planing angles. The diagonal mounting of the said upper rods, as shown in plan in FIG. 7, locates the axles transversely and divides lateral forces equally between mainrail members 16, 18 (triangle of forces) while maintaining the suspension symmetrical.

In operation, the axles are located and guided by lower longitudinal torque rods 58, 60 and upper diagonal torque rods 68, 70. The axles 52, 56 in turn locate and guide walking beams 34, 36 which articulate as the axles ride over road bumps cutting the effective height of bumps in half; i.e. the two axles transmit each bump twice to the centre of the walking beam, but the walking beam only travels vertically one-half the height of the bump. Air springs 26, 28 at the inner ends of transverse levers 30, 32, to be described in more detail hereinbelow, permit vertical oscillation of transverse levers 30, 32 to absorb vertical movement of the walking beams.

Figure 5:
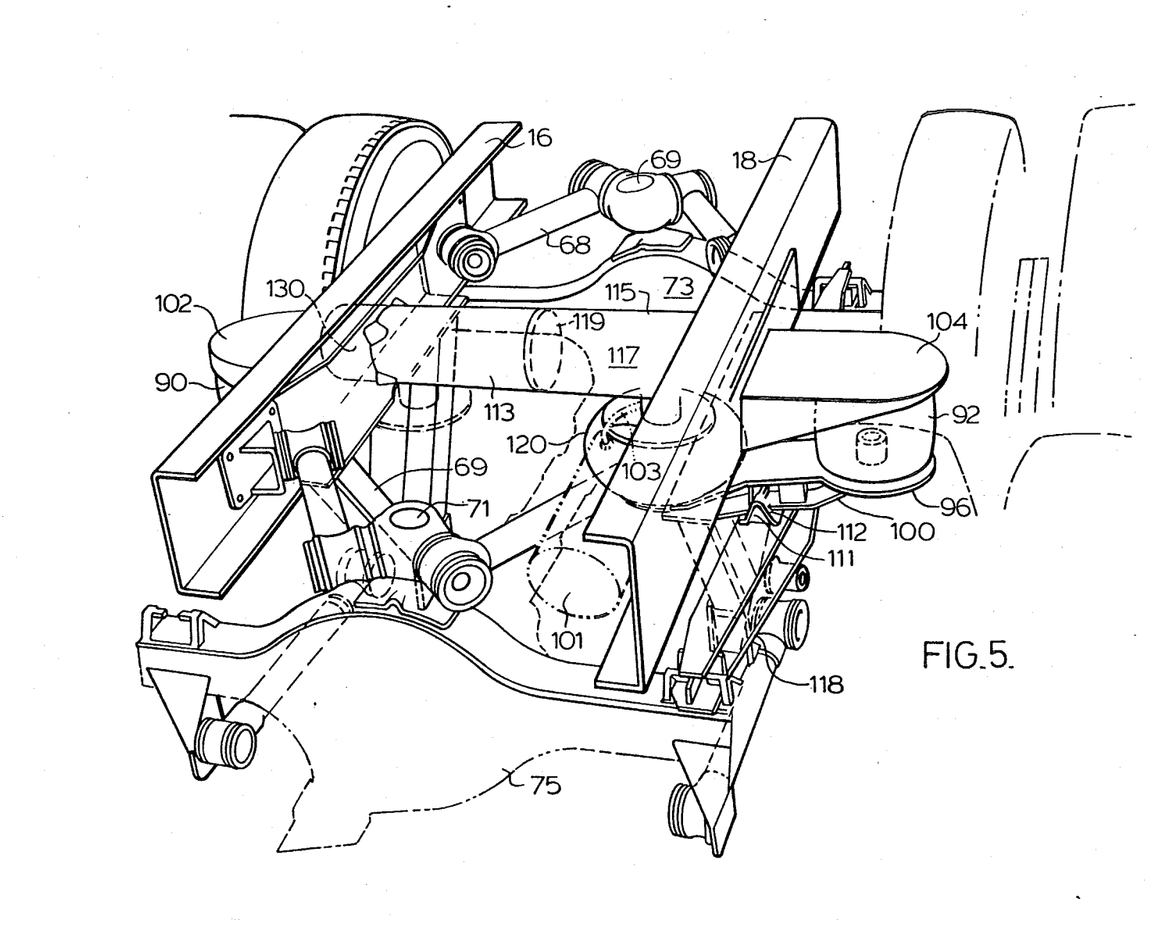
FIG. 5 is a perspective view of another embodiment of my invention employing an air spring and rubber spring in combination.
Figure 6:
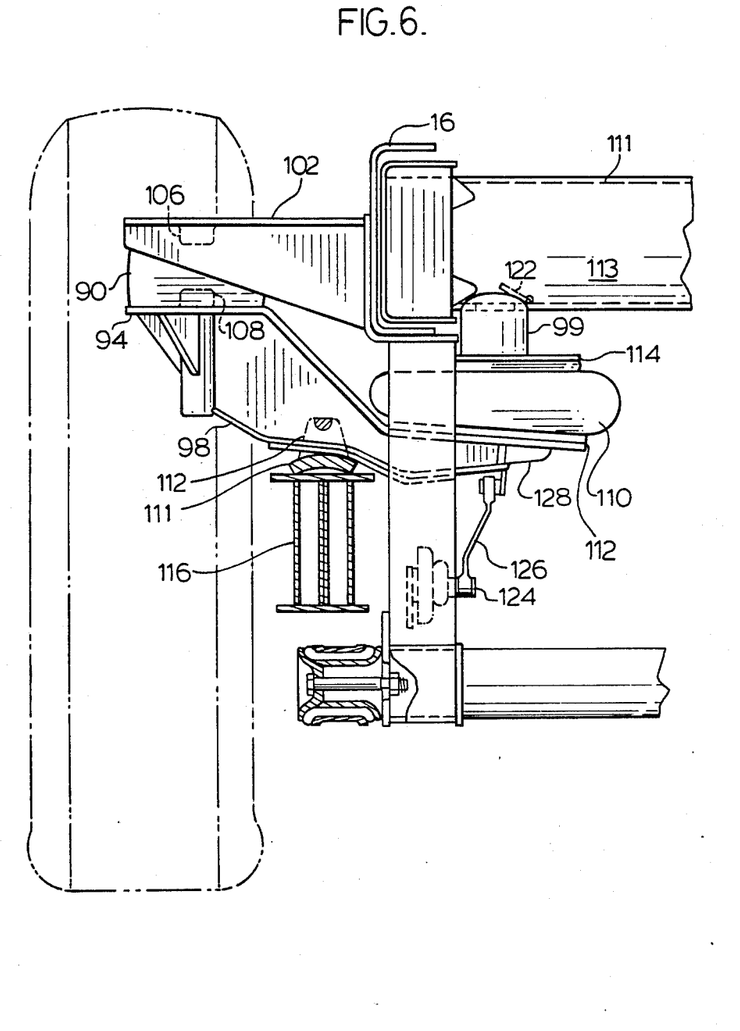
FIG. 6 is a rear elevation of the suspension illustrated in FIG. 5.

FIGS. 5 through 8 illustrate another embodiment of my invention in which rubber springs 90, 92 are interposed between the outer ends 94, 96 of transverse levers 98, 100 and respective outrigger brackets 102, 104 to provide the combination of an air spring and a rubber spring as typified by the combination of air spring 120 and rubber spring 92. Brackets 102, 104 secured to frame members 16, 18, as shown most clearly in FIGS. 5 and 6, are reduced in height relative to the bracket embodiment illustrated in FIGS. 1–4, to accommodate compression type rubber springs 90, 92 such as CHALMERS LOADGUARD NO. 15 TM springs.

Figure 9:
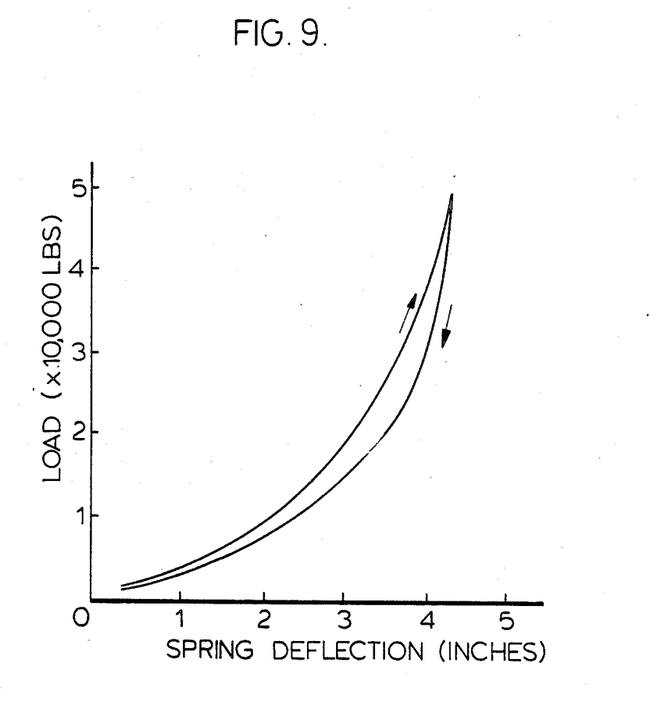
FIG. 9 is a graph illustrating hysteresis of a rubber spring.

With reference to FIG. 6, in which the left portion of suspension shown in FIG. 5 is illustrated, each of outrigger bracket 102 and transverse lever 98 has a spigot 106, 108 inserted into a mating socket in opposite ends of rubber spring 90 to anchor the said spring therebetween. FIG. 9 illustrates the hysteresis of a rubber spring under various load conditions.

The air spring 110 at the opposite inner end of lever 98 is secured to lever 98 and to downward tubular extension 99 of cross member 111 by flanged connections 112, 114. Air spring 110, and also air spring 120 in like manner, can be thus communicated with respective air reservoir compartments 113, 115 defined in tubular cross member 117 by central baffle 119. Tubular extension 99 has check valve 122, to allow substantially unrestricted flow of air from air spring 110 into reservoir 113 as spring 110 is compressed by upward movement of transverse lever 98 (jounce) while restricting the return flow of air to spring 110 as lever 98 returns downwardly to its normal position (rebound) in a ratio of about 2:1. Oscillations of the lever 98 and the associated suspension are thus damped.

A reservoir compartment formed by an air tank 101 mounted inboard of each side channel member 16, 18 may be preferred, as depicted by broken lines 101 in FIG. 5 for a representative tank 101. Each tank 101 has a conduit 103 communicating the air in spring 120 thereto with a check valve arrangement provided in the conduit or in the tank to restrict return air flow to the spring relative to air flow from the spring, thus providing the damping referred to above. A ratio of air flow resistance from the air spring relative to the return air flow to the air spring in the range of about 2:1 to in excess of about 3:1 has been found to provide good damping.

Tubular cross member 117 is secured at each end to a transverse channel member 130 such as by bolts or like fasteners, not shown, to form an H-shaped assembly which is secured to the mainrail channel members 16, 18 to impart high torsional stiffness to the frame and to effectively preclude twisting of this reinforced portion of the frame. Tubular cross members 117 is shown with a circular cross section, but it will be understood that the cross member can be rectangular in cross section, e.g. square, closed on all sides to provide maximum torsional stiffness.

An air spring levelling valve 124 mounted on a frame extension, not shown, has a link 126 pivotally connected to the underside of the inboard end of each transverse lever, as depicted in FIG. 6 for lever 98. Downward deflection, for example, of the inner end 128 of lever 98 due to increased load would be communicated to valve 124 by linkage 126 to open valve 124 and allow air under pressure into air spring 110 to increase the air pressure thereof and to raise frame channel member 16 and the corresponding side of the vehicle. For example, spring air pressure may be increased from as low as about 10 pounds per square inch gauge (psig) for a partial load to about 90 psig for a full load or unbalanced load to level the vehicle.

Transverse levers 98, 100 are positioned by respective outer rubber springs 90, 92 and respective inner air spring 110, 120 over walking beams 116, 118 and are seated on saddles 111 secured to the uppersides of said walking beams 116, 118 for pivotal or rocking inter-connection therebetween. Wheel axles 131, 133 are located and are secured to the vehicle chassis by lower torque rods 58, 60 which are secured to saw horse 135 at their inner ends and to downward extensions of axles 131, 133 at their outer ends, and by upper diagonal torque rods 68, 70 mounted on banjo housing towers 134 at their inner ends and secured to frame members 16, 18 at their opposite ends, as has been discussed with reference to the first embodiment of my invention. Torque rod bushings 136 permit pivotal inter-connection of upper and lower torque rods to respective chassis frame, saw horse and axle components.

Articulation of axles 131, 133 relative to the chassis and any resulting vertical movement of walking beams 116, 118 due to vehicle travel over uneven road surfaces or due to road shocks are transmitted to air springs 110, 120 a to rubber springs 90, 92 by transverse levers 98, 100. The proportion of amplitude of vertical travel imparted to the air springs 110, 120, relative to rubber springs, will vary according to the load condition at any time which determines the air spring pressure. At no-load or low-load conditions, the low air spring pressure of about 10 psig will allow the air springs to compress substantially more than the stiffer rubber springs to absorb road shocks. As load conditions are increased to full load with a spring pressure of about 90 psig, the air springs become as stiff or stiffer than the rubber springs to more equally share absorption of road shock.

Air from each air spring 110, 120 is forced into reservoir compartments 113, 115 respectively through the four ports 121 with relatively little resistance due to the opening of check valves 122 during upward travel of the inner ends or the transverse levers 98, 100 to assist in the absorption of road shock as the air temporarily compresses in the air springs and reservoirs. Upon downward return of the inner ends of the levers 98, 100 to their normal positions with attendant reduction of air pressure in air springs 110, 120, the return air flow from the reservoirs is restricted by the closing of half of the check valves 122 to damp oscillations of the suspension and the vehicle. Although a 2:1 ratio of air flow exhausting from and returning to each air spring is described, it will be understood that this ratio may be increased to about 3:1 or more, depending on the damping requirements of a particular suspension.

The mated rubber and air springs at opposite ends of the transverse levers provide different characteristics which are always out of phase with each other such that the two springs cannot float up and down together. This combination of an air spring with a rubber spring, coupled with the hysteresis of the rubber spring taken together with restriction of air flow back to the air springs, effectively damps the suspension to eliminate the need for shock absorbers. The variable rate springs lower the resonant frequency of the suspension. A conventional road tractor having this latter embodiment of rear suspension had a resonant frequency of about 140 cycles per minute (cpm) unloaded, much lower than conventional suspensions; about 115 cpm when coupled to an empty semi-trailer; about 100 cpm with a trailer half-loaded; and about 92 cpm at full load.

The suspension responded readily to small road irregularities and bumps. At two miles per hour the truck started to float up and down about one-half inch at the tandem centre-line, but the movement was not felt forward in the cab. Any greater travel was quickly damped, primarily by the damped orifices. Thus, there was no bouncing of the truck and the ride was very smooth; the damping being effective over the whole range of travel speed and load conditions.

The present invention provides a number of important advantages. Unlimited articulation of the vehicle axles and the walking beams is permitted allowing both on-and-off-highway travel. Low suspension resonant frequencies are attained for improved comfort and for protection of cargo. The damping effect of the rubber-air springs is effective at the walking beams without restriction of the beams movement.

Conventional shock absorbers are not necessary, thereby obviating their installation, maintenance and replacement costs and the transmitting of hydraulic shocks to the vehicle frame through the shock absorber assemblies. A wide spacing effect provided by the suspension minimizes lateral rocking and improves stability while the tubular crossmember structure imparts high torsional stiffness to the vehicle frame. The suspension is lighter in weight than conventional suspensions allowing an increased load capacity. The inboard placement of the air springs permitted by the use of transverse levers protects the springs from road hazards while reducing the required size of air springs. Rupture of an air spring or other loss of pressure at an air spring results in little change in vehicle height. A 1.5 inch loss in air spring height results in about 0.75 inch loss of height at a walking beam and, since each air spring has a rubber bumper, the vehicle can continue its travel with a rubber cushion at each end of the transverse lever.

It will be understood, of course, that modifications can be made in the embodiment of the invention illustrated and described herein without departing from the scope and purview of the invention as defined in the appended claims.

The embodiment of the invention in which an exclusive property or privilege, is claimed are defined as follows:

1. A suspension system for a vehicle having a frame and a pair of tandem axles disposed beneath said frame transversely thereof comprising, in combination:
    means interconnecting said axles and said frame for locating said axles relative to the frame and for permitting said axles to articulate relative to each other and to said frame;
    a walking beam disposed beneath said frame on each side thereof parallel to the longitudinal axis of the frame, each said walking beam resting at each end on an axle;
    an outrigger bracket extending outwardly from each side of the frame in substantial alignment with each other opposite the mid-point of a walking beam;
    a transverse lever pivotally seated between its ends on each of said walking beams in alignment with one of said outrigger brackets, and means for connecting the outer end or said transverse lever to the said outrigger bracket;

a pair of air springs positioned under said frame in side-by-side relation in alignment with said transverse levers; and means for connecting the inner ends of said transverse levers to the underside of said air springs.

2. A suspension system as claimed in claim 1 comprising an air reservoir compartment mounted on said frame for each of said air springs, and communicating means for permitting the flow of air between each air spring and its respective reservoir compartment.

3. A suspension system as claimed in claim 2 in which means are provided in said communicating means for restricting the return flow of air to the air spring relative to the flow of air to the reservoir compartment from the air spring.

4. A suspension system as claimed in claim 3 in which the means for restricting the return flow of air are valve means, said valve means permitting an air flow from the air spring relative to the return air flow to the air spring as a ratio in the range of about 2:1 to about 3:1.

5. A suspension system as claimed in claim 1 comprising a closed tubular member rigidly mounted in said frame and extending transversely of said frame from one side of the frame to the other side in alignment with the outrigger brackets for providing torsional stiffness to the frame.

6. A suspension system as claimed in claim 5 in which said closed tubular member is cylindrical and has a channel member rigidly secured at each end thereto to form an H-shaped assembly for securement to the frame by both sides of the H-shaped assembly.

7. A suspension system as claimed in claim 1 comprising, a tubular member mounted in said frame and extending transversely of said frame from one side of said frame to the other side, a centre baffle for providing said tubular member into two compartments, means for communicating each compartment with an air spring, and valve means in said communicating means for restricting the flow of air from the reservoir to the air spring relative to the flow of air from the air spring to the reservoir.

8. A suspension system as claimed in claim 7 in which said valve means permit an air flow from the air spring relative to the return air flow to the air spring in the ratio of about 2:1 to about 3:1.

9. A suspension system as claimed in claim 2 in which a rubber spring is interposed between the outer end of each said transverse levers and the respective outrigger bracket.

10. A suspension system as claimed in claim 7 in which said tubular member is cylindrical.

11. A suspension system as claimed in claim 5 in which a rubber spring is interposed between the outer end of each of said transverse levers and the respective outrigger bracket.

12. A suspension system as claimed in claim 7 in which said tubular member is cylindrical and in which a rubber spring is interposed between the outer end of each of said transverse levers and the respective outrigger bracket.

13. A suspension system as claimed in claim 12 in which said valve means permit an air flow from the air spring relative to the return air flow to the air spring in the ratio of about 2:1 to about 3:1.

* * * * *